(12) United States Patent
Shekhar et al.

(10) Patent No.: US 10,235,226 B1
(45) Date of Patent: Mar. 19, 2019

(54) SYSTEM AND METHOD FOR MESSAGE MANAGEMENT ACROSS A NETWORK

(71) Applicant: Cisco Technology, Inc., San Jose, CA (US)

(72) Inventors: Ravi Shekhar, Pune (IN); Ameo Ghosh, Mohammadwadi (IN); Ian McDowell Campbell, Littleton, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/107,794

(22) Filed: Aug. 21, 2018

Related U.S. Application Data

(63) Continuation of application No. 16/044,288, filed on Jul. 24, 2018.

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |
| *H04L 29/08* | (2006.01) |
| *H04L 12/781* | (2013.01) |
| *H04L 12/773* | (2013.01) |
| *H04L 12/741* | (2013.01) |

(52) U.S. Cl.
CPC ............. *G06F 9/547* (2013.01); *H04L 45/52* (2013.01); *H04L 45/60* (2013.01); *H04L 45/745* (2013.01); *H04L 67/02* (2013.01)

(58) Field of Classification Search
CPC ...................................................... G06F 9/547
USPC ......................................................... 719/330
See application file for complete search history.

(56) References Cited

U.S. PATENT DOCUMENTS

| | | | |
|---|---|---|---|
| 4,236,068 A | 11/1980 | Walton | |
| 5,642,303 A | 6/1997 | Small et al. | |
| 5,751,223 A | 5/1998 | Turner | |
| 6,812,824 B1 | 11/2004 | Goldinger et al. | |
| D552,603 S | 10/2007 | Tierney | |
| 7,573,862 B2 | 8/2009 | Chambers et al. | |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS de Sousa et al., "Network Service Orchestration: A Survey," IEEE Communications Surveys & Tutorials, Mar. 23, 2018, pp. 1-30.

(Continued)

*Primary Examiner* — Timothy A Mudrick
(74) *Attorney, Agent, or Firm* — Polsinelli PC

(57) ABSTRACT

Systems, methods, and computer-readable media for managing service calls over a network may include a signal routing engine with a maintained forwarding table for various network functions and micro-services in a services back end for the network. The signal routing engine can include a call conversion service for converting REST API calls to an internal network call protocol for increasing network function processing speeds, decreasing bandwidth usage, and improving network responsiveness and manageability.

20 Claims, 8 Drawing Sheets

(56) References Cited

U.S. PATENT DOCUMENTS

| | | |
|---|---|---|
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Spiel et al. |
| 9,858,559 B2 | 1/2018 | Raleigh et al. |
| 9,860,151 B2 | 1/2018 | Ganichev et al. |
| 9,923,780 B2 | 3/2018 | Rao et al. |
| 9,933,224 B2 | 4/2018 | Dumitriu et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |

(56) References Cited

U.S. PATENT DOCUMENTS

| | | |
|---|---|---|
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0273083 A1 | 9/2017 | Chen et al. |
| 2017/0317997 A1 | 11/2017 | Smith et al. |
| 2017/0332421 A1 | 11/2017 | Sternberg et al. |
| 2017/0339706 A1 | 11/2017 | Andreoli-Fang et al. |
| 2018/0054765 A1* | 2/2018 | Kim .................. H04W 4/70 |
| 2018/0063018 A1 | 3/2018 | Bosch et al. |
| 2018/0069311 A1 | 3/2018 | Pallas et al. |
| 2018/0084389 A1 | 3/2018 | Snyder et al. |

FOREIGN PATENT DOCUMENTS

| | | |
|---|---|---|
| WO | WO 2015/131920 | 9/2015 |
| WO | WO 2017/078657 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

Ventre et al., "Performance Evaluation and Tuning of Virtual Infrastructure Managers for (Micro) Virtual Network Functions," ieee.org, Nov. 7-10, 2016, pp. 1-7.

"Cisco ASR 5x00 Mobility Management Entity Administration Guide," Version 15.0, Cisco Systems, Inc., Last updated Jun. 13, 2014, pp. 1-266.

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to the University of Liverpool, Sep. 28, 2005, 116 pages.

Galvan T., Carlos E., et al., "Wifi bluetooth based combined positioning algorithm," International Meeting of Electrical Engineering Research ENIINVIE 2012, Procedia Engineering 35 (20-12 ), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2_Roaum_Roaming_IoT_Whitepaper.pcif, pp. 1-14.

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, ULF, "Supporting Location-Awareness in Open Distributed Systems," May 1998, 186 pages.

Morozov, Yury, "Blockchain Telecom: Bubbletone Blockchain," Dec. 29, 2017, pp. 1-33.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Shwetha, D., et al.,"A Bandwidth Request Mechanism for QoS Enhancement in Mobile WiMAX Networks," International Journal

(56) References Cited

OTHER PUBLICATIONS of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

* cited by examiner

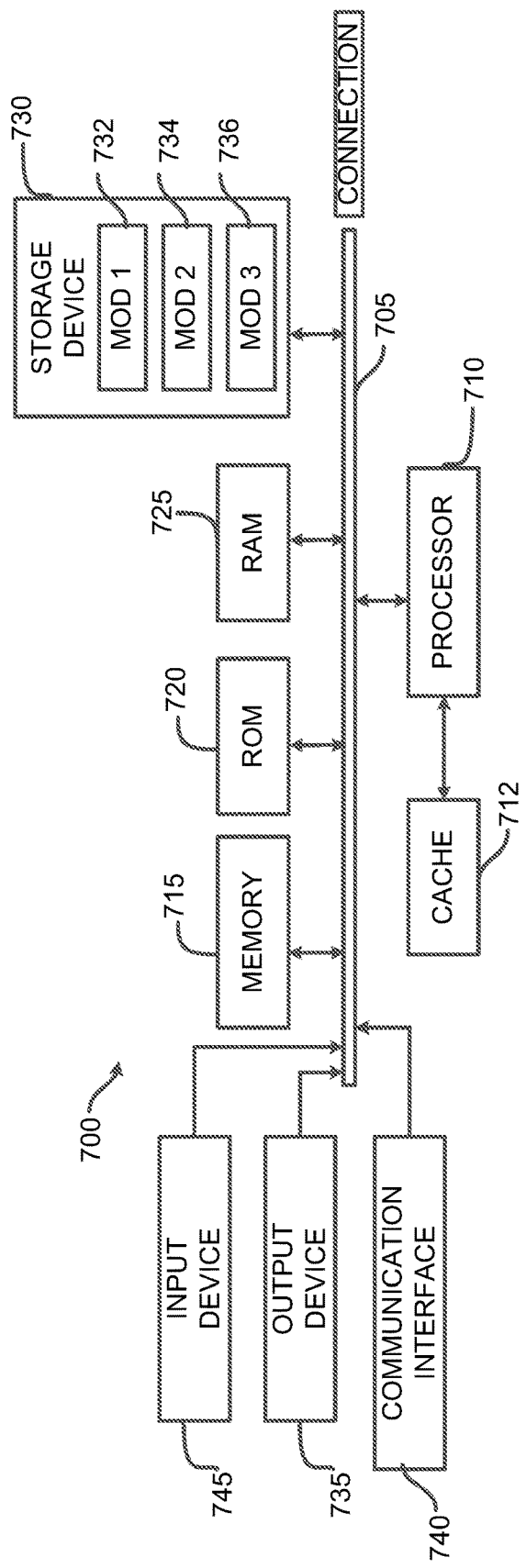

SYSTEM AND METHOD FOR MESSAGE MANAGEMENT ACROSS A NETWORK

CROSS-REFERENCE TO RELATED APPLICATIONS

This application is a Continuation of U.S. application Ser. No. 16/044,288, entitled "SYSTEM AND METHOD FOR MESSAGE MANAGEMENT ACROSS A NETWORK," filed on Jul. 24, 2018, the content of which is incorporated herein by reference in its entirety.

TECHNICAL FIELD

The present technology pertains to network configuration and signal processing.

BACKGROUND 5G mobile networking must meet ever more diverse demands. Generally, the demands on a 5G mobile network can impact the number of sustainable connections, latency, and throughput across the network. As the number of devices connected over 5G networks increases, an exponential number of connections increases as well; applications such as self-driving cars often require ultralow latency connections; and, as compared to 4G networks, the throughput requirements on 5G networks is often a thousand times higher than on 4G networks, thus requiring vast numbers of representational state transfer (REST) calls over hypertext transfer protocol (HTTP) connections between various network functions (NF) underpinning 5G networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates an example computing device.

DESCRIPTION OF EXAMPLE EMBODIMENTS

Figure 1A:
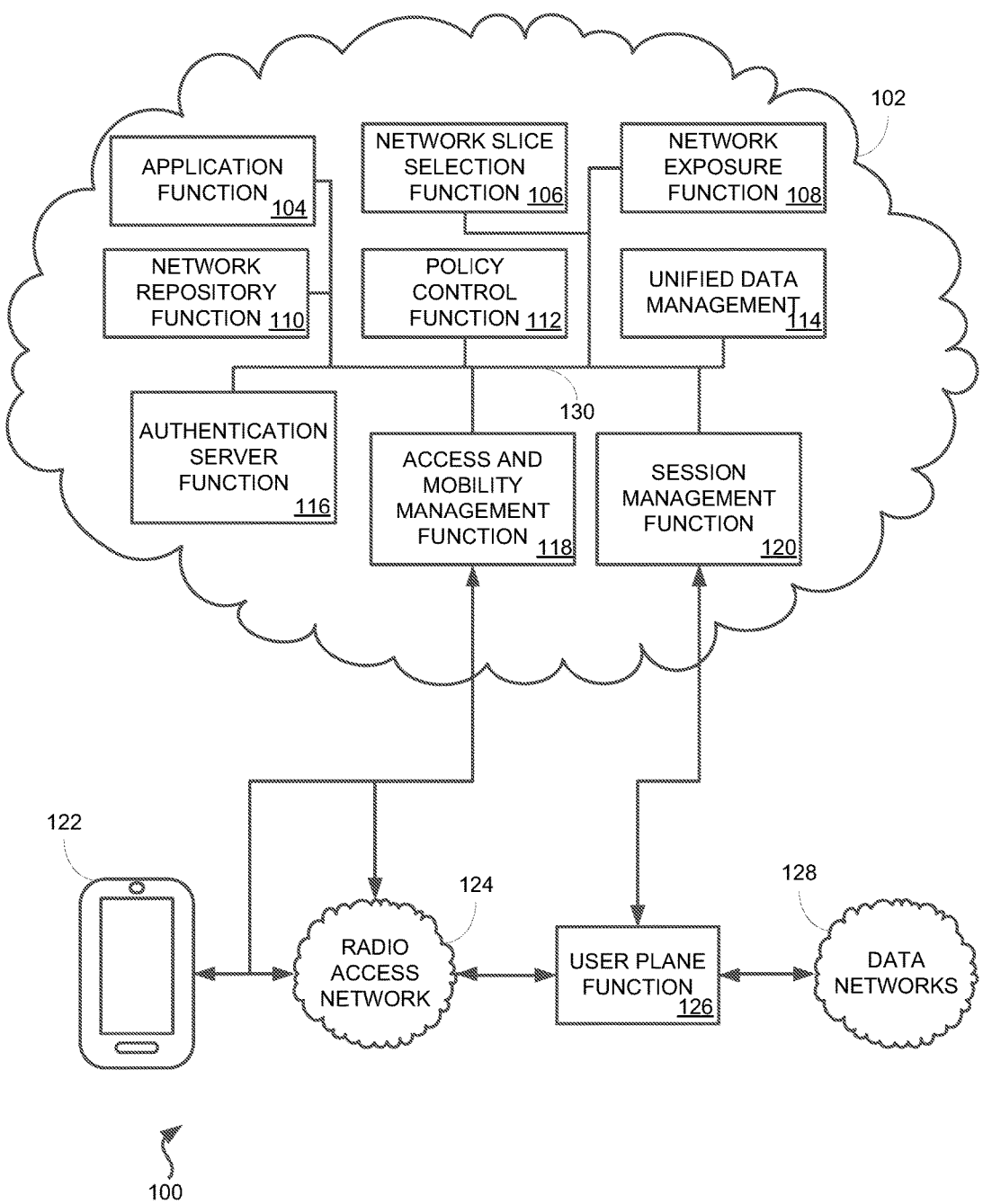
FIG. 1A depicts a service based illustration of an example network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

A 5G network architecture may be a service based architecture (SBA) in which various services within NFs use REST application programming interface (API) calls over HTTP/2 as a control plane signaling protocol. In a system deployed to some degree over a cloud native environment (CNE), these services may have one or multiple HTTP/2 terminating endpoints which may be dynamically added or removed to facilitate respective scaling and descaling of the system. In particular, CNE services can be started on different server blades, virtual machines (VMs), containers and the like depending on resource availability. As a result, signaling (e.g., message handling) and connection management can become difficult as message routing becomes more complex in tandem with more services being added to the system.

Furthermore, in the case of container orchestration and management, creation of new virtual network functions (VNFs) to support containers and automatic learning of configuration changes may add additional traffic load to the network that is difficult to manage. It may take considerable time to determine where a request should be forwarded to and/or how to forward it. Geographic location, data center location, and similar factors may need to be determined in order to properly forward requests and each of these determinations may require further series of REST API calls and other requests in order to complete.

In a particular embodiment, a network function endpoint address may be received and stored in a forwarding table. Further, a requestor may make a web protocol (e.g., HTTP/2 and the like) directed to the network function endpoint. The web protocol call may be converted into a micro-services protocol (e.g., gRPC) and transmitted to the network function endpoint by using the address stored in the forwarding table. A response, in the micro-services protocol, can then be received from the network function endpoint and converted into the web protocol before being transmitted to the requestor.

EXAMPLE EMBODIMENTS

A signal routing engine for 5G (5GSRE) can receive requests and otherwise manage signal routing in order to increase efficiency and scalability across the network. For example, the 5GSRE can manage external HTTP connections and provide lightweight, efficient, and/or easily updated protocols for internal network communications (e.g., between micro-services and the like). For internal network services, a more efficient protocol, such as gRPC and the like may be utilized for communications instead of REST format.

In comparison, where a request is received from outside the internal network (e.g., another network) and is directed to an internal network service, the 5GSRE can receive the call, convert it into an appropriate internal protocol and transmit it to the intended recipient service in a more efficient format and protocol before inverting the process on any output produced in response to the request.

The 5GSRE can dynamically add or remove a stored listing of network functions (NFs) as the respective network grows and shrinks. NFs can include, for example and without imputing limitation, virtualization functions, reporting functions, logging functions, and the like. For example, as seen in Table 1 below, a service listing table can be stored on the 5GSRE in, for example, memory and provide for internet protocol (IP) address mappings for each service. Table 1 maps each service name, or NF, to an endpoint (EP) and a location:

TABLE 1

| Service Name | EP | Location |
| --- | --- | --- |
| Service 1 | IP1:3868, IP2:3869 | Blade-1, VM1 |
| Service 2 | IP3:3868 | Blade-2, VM2 |
| Service 3 | IP:27717 | Blade-1, VM3 |
| . . . | . . . | . . . |

Table 1 and the like may be stored in, for example, a routing registry which is accessible by NFs and may be updated by a network repository function (NRF) and the like. Updates may occur upon discovery of a new NF or detection of a NF failure and the like. Generally, where a call to, for example, Service 1 is made via a NF, the NF can query the routing registry for the proper IP address to which to direct the call. The routing registry can look up the IP address, or EP, for the designated service by searching an internally stored table such as Table 1 above. Accordingly, as services are discovered on the network and added to the stored table, queries may take an increasingly longer time to complete.

In addition, where requests are transmitted over HTTP using REST API calls, each recipient NF may need to decode each received request from a REST format (e.g., JavaScript Object Notation (JSON) and the like) for internal processing and then encode output into the same format before transmitting the response. In some examples, decoding can involve tedious and compute-intensive processing techniques such as string parsing and the like in order to convert, for example, a JSON request into a format usable internally to by the receiving NF. Further, REST format transmissions may generally include more data overall and so make for, relative to inherently serialized techniques for example, inefficient communications.

However, in one embodiment, the 5GSRE can maintain a forwarding table in order to speed up searches and also reduce connection management complexity by centralizing and reducing the number of calls between services. By consolidating lookup and routing processes to the 5GSRE, faster lower level interface (e.g., a southbound interface (SBI) layer) protocols may be used instead of more complex interface protocols such as those used in a northbound interface (NBI) layer for communication between services.

In general, the 5GSRE can receive a request or call from, for example, a user device or other user equipment. For example, a user device such as a smartphone and the like may attempt an attach procedure which will generate an initial request transmitted to an access and mobility management function (AMF). As a smartphone transitions between network coverage, new network sessions with respective changing networks can be created to ensure continued connectivity. Initiation of these network sessions is referred to as an "attach procedure" and can include transmitting an attach request to a nearby network node.

As a smartphone attaches to different networks, either the device itself or the AMF it is linked to, may need "slice" information in order to properly connect to the network. Generally, a network slice denotes a logical grouping of network resources across a network. This logical grouping can be based on various factors such as, without limitation, industry, subscription, network management factors such as congestion and the like, and various other factors as will be understood by a person having ordinary skill in the art. For example, a user device associated with emergency services or first responders may be assigned to an ultralow latency slice, or a slice may only include devices having a threshold security level in order to process sensitive transmissions, and the like. Nevertheless, it may be necessary to retrieve slice identification when a device performs an attach or similar procedure.

In one embodiment, the AMF may transmit to the 5GSRE a request for slice information. In contrast, a typical attach request may otherwise be transmitted from the AMF directly to a network slice selection function (NSSF) as a REST API call including, for example, a "GET" query, in Standard Query Language (SQL) format, for slice information. With a REST call, the NSSF will then need to convert the REST format into an internal format in order to process the call and produce output, which must likewise be converted between the internal format and the REST format.

In the case of an attach procedure, the slice information can then be used to reach a desired NF instance which may assign a quality of service (QoS). The QoS may then be further impact a quality of experience (e.g., with the appropriate QoS) for the "attach" device. The QoS selection can be based on various factors, such as, for example and without imputing limitation, a subscription plan associated with the device and the like. The QoS may be assigned by a policy control function (PCF) and the PCF may interact, directly or indirectly, with a session management function (SMF) to maintain the session, or window of attachment, to the attaching device (e.g., smartphone).

In the typical attach procedure, the AMF may use the slice information to transmit a REST "POST" SQL statement directly to the SMF. As a result, the SMF may transmit a REST GET SQL query to the PCF in order to determine a proper QoS to assign to the session. The responses for each transmission may similarly be transmitted as REST format SQL statements (e.g., a REST POST statement and the like).

In comparison, in one embodiment, the AMF may transmit a session creation message to the SMF which in turn can retrieve QoS information by interfacing with the 5GSRE. The SMF may transmit a query call to the PCF in a non-REST format. The PCF can transmit the appropriate QoS information back to the 5GSRE in response. The 5GSRE may then transmit the QoS information to the SMF which in turn can finalize the session. Once the session is finalized, the SMF may transmit notice to the AMF which itself notifies the attaching device that the attachment procedure has completed and that the device is now attached to the network.

In some embodiments, the 5GSRE may register with a NRF in order to maintain proper routing, via a forwarding table, to newly added services in the network. Likewise, by registering with the NRF and performing, for example, regular synchronization procedures or validation checks, the 5GSRE may remove from its forwarding table services which are no longer available in order to reduce overhead processing and the like. In another example, a subscription based policy can be utilized by the 5GSRE to receive notifications of changes to the NRF. The notification may include identification of a particular service and whether it has been added to the NRF or removed from the NRF. If the service has been added to the NRF, an endpoint or IP address may also be included with the notification. Further, any changes to services, such as additional endpoint locations, can also be provided as notification.

The 5GSRE can also include routing rules and the like to be applied to messages in tandem with the forwarding table. For example, where a service is associated with multiple endpoints, the 5GSRE may forward messages to a particular endpoint based on, without limitation, geographical location of the requestor, subscription type of the requestor, network congestion, availability status of other endpoints, and various other considerations as will be apparent to a person having ordinary skill in the art.

In some embodiments, the 5GSRE may be run as multiple instances within a data center. A Global 5GSRE (e.g., a master 5GSRE which can control other 5GSREs) may replicate new or changed data to all of the 5GSRE instances running within the data center. Further, the 5GSRE instances may be registered with the Global 5GSRE to support service across multiple data centers (e.g., a 5GSRE may be in a first data center and a service within its forwarding table in a second data center) in order to support geographically aware capabilities for NFs.

Figure 1B:
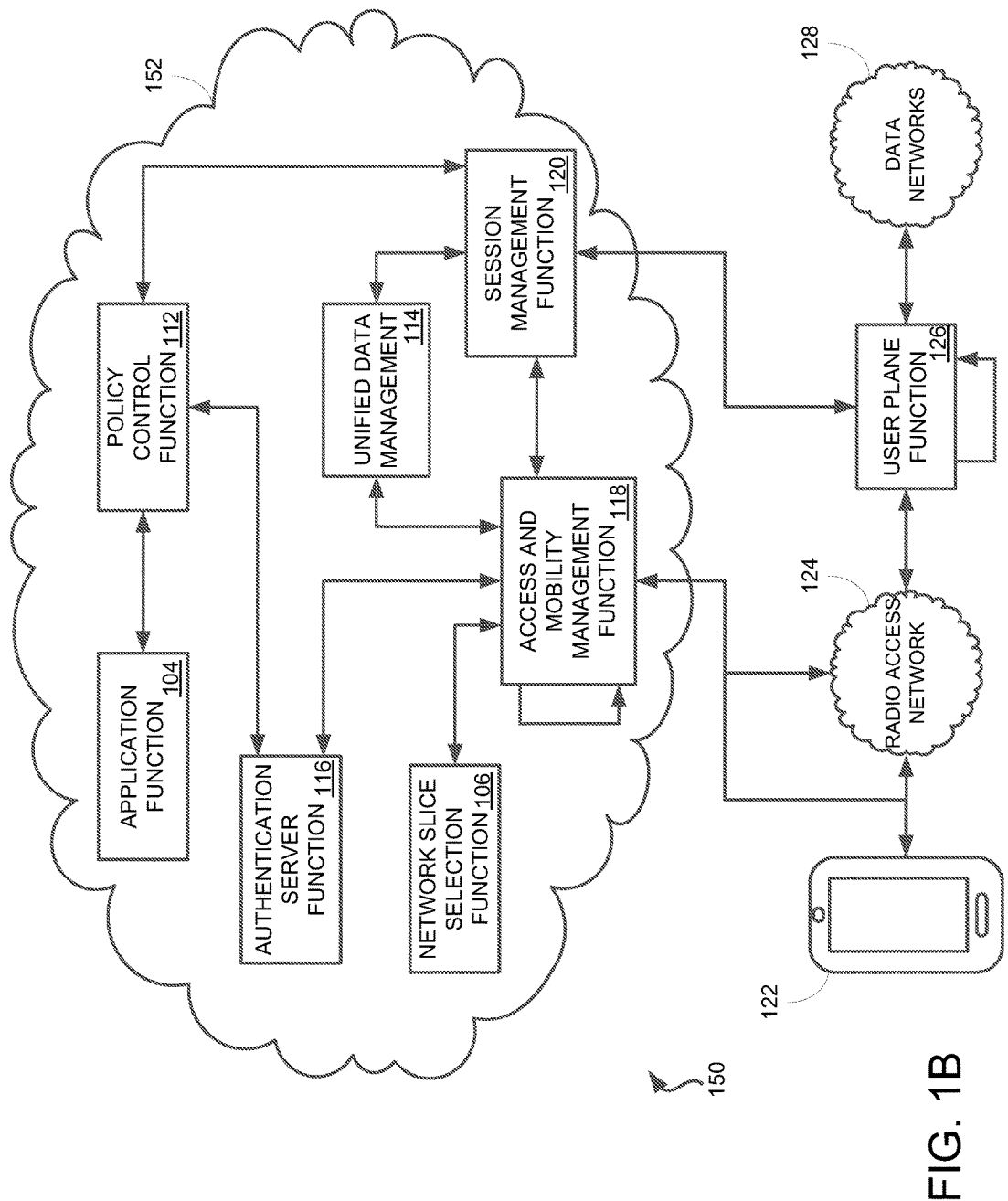
FIG. 1B depicts a reference point representation architectural model of an example network.

Turning to FIGS. 1A and 1B, mobile networking environments 100 and 150 are illustrated in a service-based and point reference-based depiction respectively. A typical mobile networking environment 100, 150 enables user devices to move from one network to another network and the like while, for example, moving through areas with coverage by various networks.

A services back end 102 and 152 includes various services for managing API calls and the like over the network. In particular, each service may be run as a micro-service, in which case it will be accessible at, for example, an endpoint associated with an IP address and the like. The micro-services can be executed by dedicated circuits, installed programs, VMs, and the like. Other configurations may execute the services as will be apparent to a person having ordinary skill in the art.

As depicted in FIG. 1A, under the service-based architecture, services may communicate with each other over a communications bus 130. Access and mobility management function (AMF) 118 may receive connection requests and the like either directly from a user device, here a smartphone 122, or over a radio access network (RAN) 124. In some examples, RAN 124 can include various towers, stations, and hops facilitating wireless networked communications as will be apparent to a person having ordinary skill in the part.

Nevertheless, AMF 118 can manage network connections of smartphone 122 by communicating over communications bus 130, or directly via point to point transmission as depicted by FIG. 1B, to the various micro-services of the services back end 102, 152. In the services-based architecture, the micro-services may include application function (AF) 104, network slice selection function (NSSF) 106, network exposure function (NEF) 108, network repository function (NRF) 110, policy control function (PCF) 112, unified data management (UDM) 114, authentication server function (AUSF) 116, and session management function (SMF) 120.

AMF 118 can interface with ASF 116 in order to validate an account associated with smartphone 122 and the like. Having validated the account, AMF 118 can then interface with NSSF 106 in order to determine an appropriate network slice to which smartphone 122 may have access. In some configurations, this can also determine particular micro-service endpoints with which AMF 118 and/or SMF 120 will interface. For example, for applications requiring low or ultralow latency, NSSF 106 may identify a network slice located as geographically proximate as possible in order to reduce transmission distance for micro-services between each other and/or the application.

AMF 118 may then interface with SMF 120 to manage a connection session for smartphone 122 over the network. PCF 112 in order to determine information related to, for example, a subscription package related to smartphone 122. For example, PCF 112 may determine a QoS and the like at which smartphone 122 can communicate across RAN 124.

NRF 110 can provide various state updates to interfacing services. For example, AMF 118 may maintain a cache of NSSF 106 endpoints and the like for performing the operations discussed above. UDM 114 and AF 104 may also interface with the various other micro-services connected to communications bus 130.

Smartphone 122 network access over RAN 124 may be further managed by a user plane function (UPF) 126 which interfaces with SMF 120. Whereas AMF 118 manages smartphone 122 joining and leaving the network, and thus being serviced by services back end 102, SMF 120 may manage smartphone 122 network usage and access via UPF 126. For example, and without imputing limitation, SMF 120 can inform UPF 126 how to process data from other data networks 128 (e.g., website access and the like).

Turning to FIG. 1B, in mobile networking environment 100, micro-services interface via point-to-point transmissions rather than along a communications bus. Services back end 152 may include the same micro-services as those found in services back end 102 (e.g., AF 104, PCF 112, AUSF 116, NSSF 106, UDM 114, SMF 120, AMF 118). Further, as with service-based architecture 100, point reference-based architecture 150 includes smartphone 122 in communication with and over RAN 124. UPF 126 manages network access by smartphone 122 along with communications by smartphone 122 with data networks 128.

However, as can be seen, AMF 118 may communicate directly with UDM 114, AUSF 116, and NSSF 106. Under the point reference-based architecture 150, AMF 118 and SMF 120 may also communicate directly with each other. SMF 120 may further communicate with UDM 114 and PCF 112. Further, PCF 112 can directly communicate with AUSF 116 and AF 104.

Figure 2:
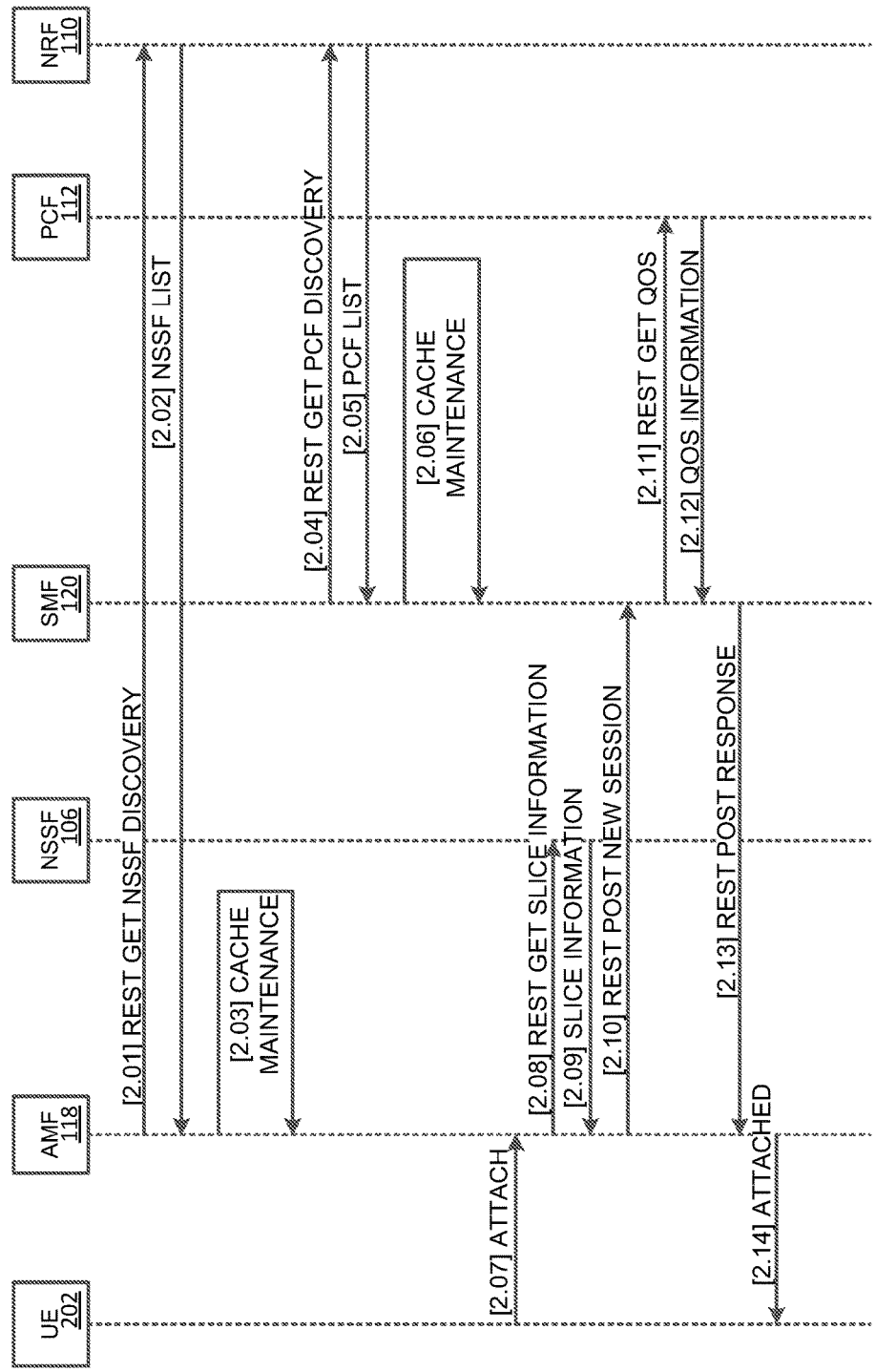
FIG. 2 depicts an example call sequence adhering to 5G standards.

FIG. 2 depicts a call sequence diagram 200 for an attach procedure which may be conducted by either of service-based architecture 100 or point reference-based architecture 150. In particular, sequence diagram 200 depicts each step and signal or message transmission between relevant entities when user equipment (UE) 202 (e.g., smartphone 122) attaches to a new network.

Prior to UE 202 attaching, AMF 118 transmits signal 2.01 to NRF 110. Signal 2.01 may be a REST GET request for discovery of NSSF 106 endpoints. For example, signal 2.01 may include a REST API call with a SQL statement such as "GET/nrf/v1/nrf-disco/search" which is parsed by NRF 110 from the REST call (e.g., a JSON object containing a SQL statement in a field) and then processed as a SQL statement. Here, the SQL statement is in fact a query for information related to NSSF 106.

In response, NRF 110 returns to AMF 118 signal 2.02 which includes a list of NSSF 106 endpoints. As a result, AMF 118 transmits signal 2.03 to itself in order to maintain a cache of NSSF 106 information. In some examples, AMF 118 may further include subservices and the like and thus signal 2.03 may be passed from one subservice to another.

Independently, SMF 120 may transmit to NRF 110 signal 2.04, which may also be a REST GET request for discovery of PCF 112 endpoints. For example, signal 2.4 may include a REST API call with a SQL query statement such as "GET/nrf/v1/nrf-disco/search" which can cause NRF 110 to transmit a signal 2.05 containing a list of PCF 112 endpoints to SMF 120. Similarly to AMF 118, SMF 120 may then transmit a signal 2.06 to itself to update or maintain a cache of PCF 112 endpoints. SMF 120 may, in some examples, also be composed of various subservices and process and thus signal 2.06 may be transmitted from one subservice to another.

At a later point, UE 202 may transmit to AMF 118 signal 2.07 indicating an attach request. For example, UE 202 may have moved into an appropriate network during travel or may be switching from one network to another and the like. Nevertheless, AMF 118 may receive signal 2.07 and, as a result, transmit to NSSF 106, identified within an updated cache, signal 2.08 including a REST API call providing a GET statement for slice information. For example, the GET statement for slice information may include "GET /nssf/v1/nssf-get/select" and the like. In response, NSSF 106 may return signal 2.09 containing slice information.

In response to returned signal 2.09, AMF 118 may transmit to SMF 120 signal 2.10 containing a REST API call with a POST statement for generating a new session for UE 202. For example, the POST statement may include "POST/smf/v1/pdusession<pdu>" and the like, which, when received by SMF 120, may cause it to transmit to PCF 112 signal 2.11. Signal 2.11 may include a REST API call with a GET statement for retrieving a QoS associated with UE 202. For example, the GET statement may include "GET/pcf/v1/qosinfo" and the like. PCF 112 may then return signal 2.12 containing respective QoS information.

Having the QoS information, SMF 120 may then transmit to AMF 118 signal 2.13 including a REST API call having a POST statement. The POST statement may include a response statement as determined by, for example, the network, UE 202 preferences, or various other factors as will be understood by a person having ordinary skill in the art. AMF 118, as a result, can transmit signal 2.14 to UE 202 informing it that the attachment procedure has completed and that UE 202 is now on the requested network.

Figure 3:
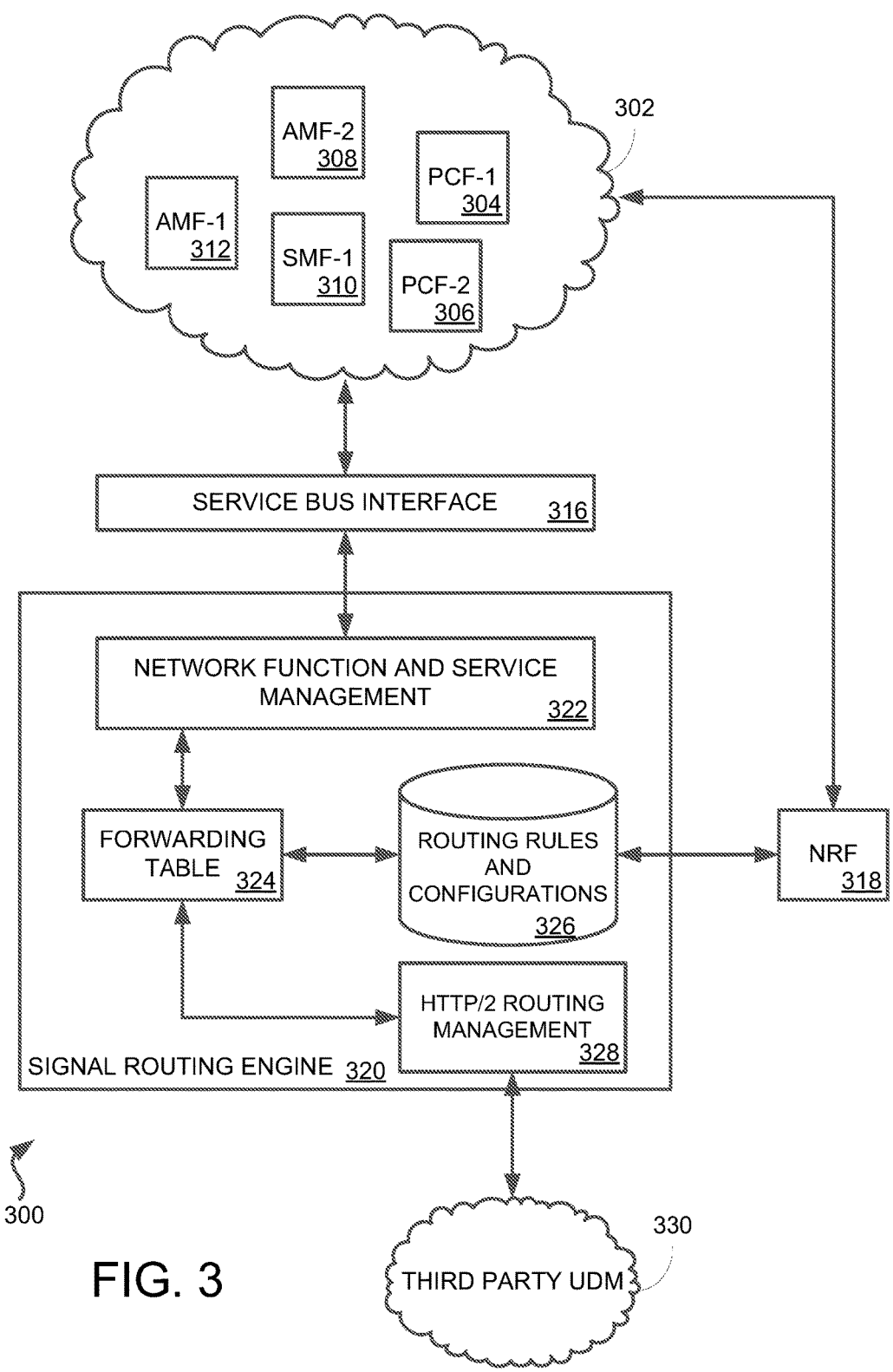
FIG. 3 illustrates an example signal routing engine.

FIG. 3 depicts a network environment 300 including a signal routing engine 320. In particular, FIG. 3 depicts one embodiment of a 5GSRE signal routing engine 320. Signal routing engine 320 can be a software executed routing engine, a VM, or a hardware routing engine in the form of an integrated circuit and the like. For example, a software executed routing engine may perform as a monolith service and generate outputs through an obfuscated, or "black-boxed," process. As another example, in comparison, a VM executing the routing engine may include various micro-services within the VM communicating endpoint-to-endpoint internally to the VM and over which reporting frameworks may be overlaid and the like, as will be apparent to a person having ordinary skill in the art.

Signal routing engine 320 may receive a transmission from, for example, third party UDM 330. Third party UDM 330 may include various signals such as device attachment requests, update requests, service configuration requests, and the like as will be apparent to a person having ordinary skill in the art. In particular, a HTTP/2 routing management service 328 within signal routing engine 320 receives the transmission from third party UDM 330.

HTTP/2 routing management service may then determine whether the received request is to be transmitted to a service back end 302 or to a third-party service. Where it is determined that a third-party service is the intended recipient, signal routing engine 320 can rebroadcast the signal back out to the intended recipient over the larger HTTP/2 network in its original format. However, if the signal is intended for one of micro-services 304-312 of service back end 302, then HTTP/2 routing management may query a forwarding table 324 to identify a micro-service endpoint for the transmission.

In some examples, where multiple endpoints are associated with a target micro-service, HTTP/2 routing management service 328 can determine a particular endpoint to which the received signal may be transmitted. HTTP/2 routing management service 328 may use rules-based logic, predetermined or dynamically determined, learned logic (e.g., applying a trained model and the like), or a mixture of the two in selecting an endpoint.

In other examples, forwarding table 324 may include stored rules for selecting an endpoint. Said rules may be stored in a routing rules and configurations data store 326.

Routing rules and configurations data store 326 may store endpoint selection rules and the like, as well as information for populating forwarding table 324 with micro-services including endpoint entries. Routing rules and configurations data store 326 can be updated by NRF 318 through regular synchronizations, broadcast subscriptions, and the like. NRF 318 may be a micro-service among back end services 302 or may be located elsewhere within the network environment 300.

A network function and service management service 322 provides an interface layer between signal routing engine 320 and a service bus interface 316. Network function and service management 322 includes procedures for converting a received signal formatted as a REST API call or the like into an appropriate service protocol call. Further, network function and service management service 322 may transmit the reformatted signal to the appropriate endpoint as determined by forwarding table 324 and/or HTTP/2 routing management service 328.

The converted signal may proceed along service bus interface 316 to and within services back end 302 in order to be received by the intended micro-service or micro-services. For example, an attach procedure as described above may be transmitted AMF-1 312 or AMF-2 308. Further, service bus interface 316 may transport signals from back end services 302 to signal routing engine 320 to, for example, return a response to a requestor. In some examples, any communications between micro-services may also be passed first to signal routing engine 320 via the service bus interface 316 and then relayed to the intended micro-service recipient in order to minimize overhead and size of each micro-service and centralize all communications into a hub-and-spoke model (e.g., signal routing engine 320 being the hub).

Figure 4:
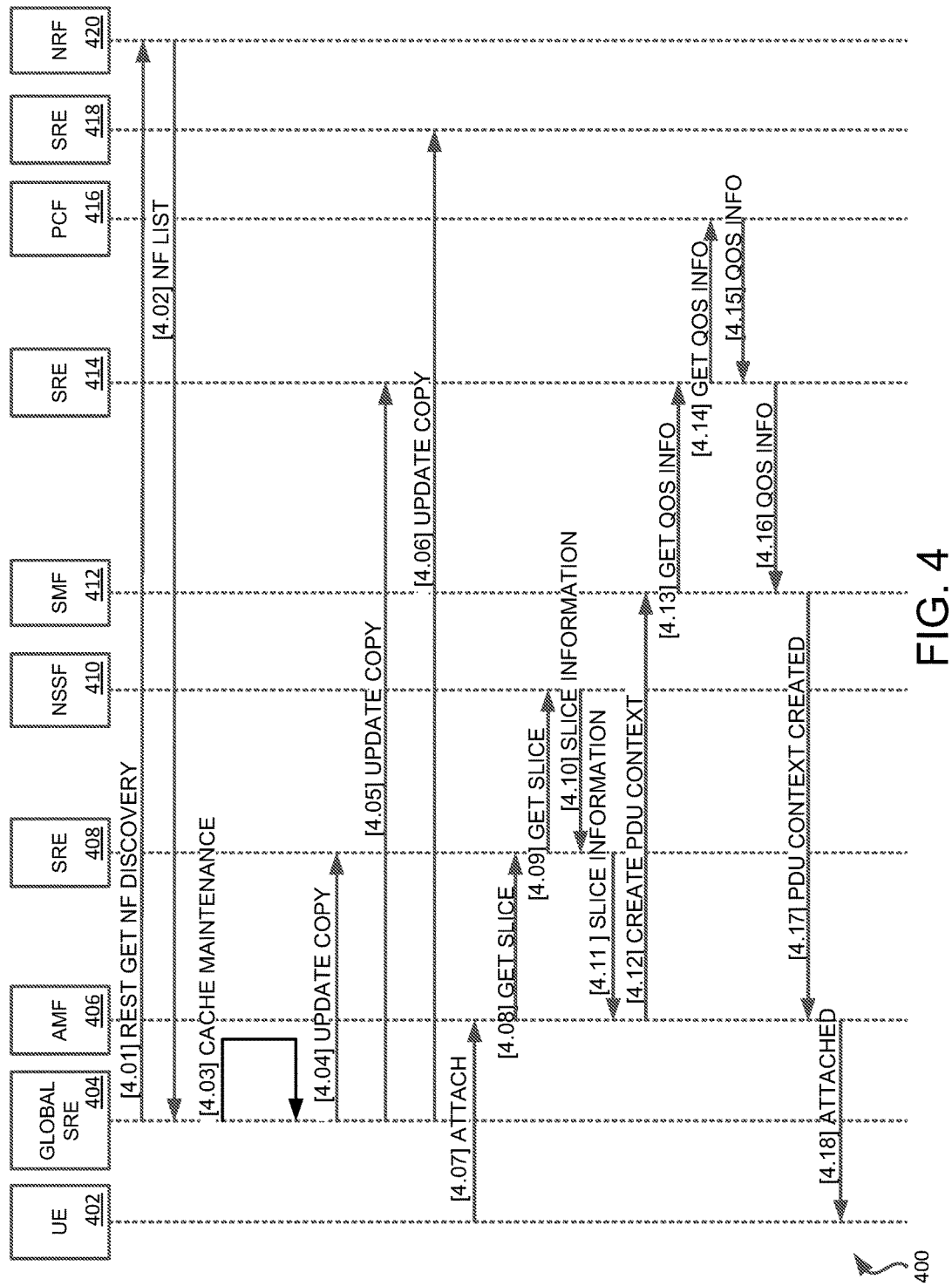
FIG. 4 depicts an example call sequence including the signal routing engine of FIG. 3.

FIG. 4 depicts a call sequence diagram 400 illustrating an attach procedure performed using signal routing engine 320. Here, a global SRE 404 maintains a globally applicable SRE state and SREs 408 and 414 maintain a portion of the state of global SRE 404 in order to manage signals over, for example, a particular network slice or a particular network geographic region and the like. In particular, call sequence diagram 400 illustrates SRE cache maintenance and attachment procedures.

Global SRE 404 transmits a signal 4.01 to a NRF 420 in order to discover available network functions and the like or to retrieve updated information on available services and endpoints within the network. In one embodiment, signal 4.01 include a REST API call with a GET statement such as "GET/nrf/v1/nrf-disco/search" and the like. In response, NRF 420 returns to global SRE 404 a signal 4.02 including a list of NFs and NF endpoint information (e.g., IP addresses and the like).

As a result, global SRE 404 transmits a signal 4.03 to itself in order to perform a cache maintenance. In one embodiment, the cache maintenance updates the stored listing of global NFs (e.g., for each network slice) to remove services no longer available and add newly provided services or update IP addresses for updated services. In some examples, global SRE 404 can be a micro-service architecture itself, in which case one subservice may transmit signal 4.03 to another subservice within the SRE 404 micro-services construction.

Global SRE 404 may then send updated copies of respective portions of the updated lists to SRE 408, 414, and 418 respectively via signals 4.04, 4.05, and 4.06 respectively. The respective portions of the updated lists may be determined based on, for example and without imputing limitation, the respective network slice for which the target SRE is responsible. While SRE 408, 414, and 418 are depicted here as receiving updates via global SRE 404, it will be understood by a person having ordinary skill in the art that, alternatively or in addition, SRE 408, 414, and 418 may receive updates directly from NRF 420 and the like.

At some later time, UE 402 may transmit to AMF 406 a signal 4.07 to attach to a particular network. For example, UE 402 may be a smartphone or the like on the move and passing between networks. As UE 402 enters a new network coverage area, an attach procedure may be initiated in order to fully join that network.

Once AMF 406 has received signal 4.07, it may transmit signal 4.08 to SRE 408 in order to identify a network slice to which UE 402 may attach. Signal 4.08 may be a low overhead signal such as, for example and without imputing limitation, gRPC and the like which provide high performance procedure call frameworks. SRE 408 may forward the received signal to NSSF 410 as a signal 4.09 according to an updated forwarding table such as forwarding table 324 discussed above. In response, NSSF 410 may then transmit slice information via signal 4.10 back to SRE 408, which in turn may forward the response to AMF 406 via signal 4.11 in order to provide AMF 406 the slice information.

AMF 406 can then use the slice information to transmit a signal 4.12 for creating a new session, or protocol data unit (PDU) context, with SMF 412. SMF 412 may respond by retrieving QoS information necessary to determine an appropriate service level at which to set the session. SMF 412 can do this by transmitting signal 4.13 to SRE 414, which may be a routing engine specialized in a particular network slice (e.g., QoS matter and the like). SRE 414 may then relay the QoS information request to PCF 416 via signal 4.14, which in turn may transmit the requested QoS information back to SRE 414 via signal 4.15. As a result, SRE 414 may transmit the QoS information via signal 4.16 to SMF 412.

Having received the QoS information, SMF 412 may produce a session, or PDU connect, for UE 402. Notification and the like may be transmitted to AMF 406 from SMF 412 via signal 4.17. In some examples, the notification may include further information for maintaining the session and the like. AMF 406 can then notify UE 402 that the attach procedure has completed via signal 4.18.

Figure 5:
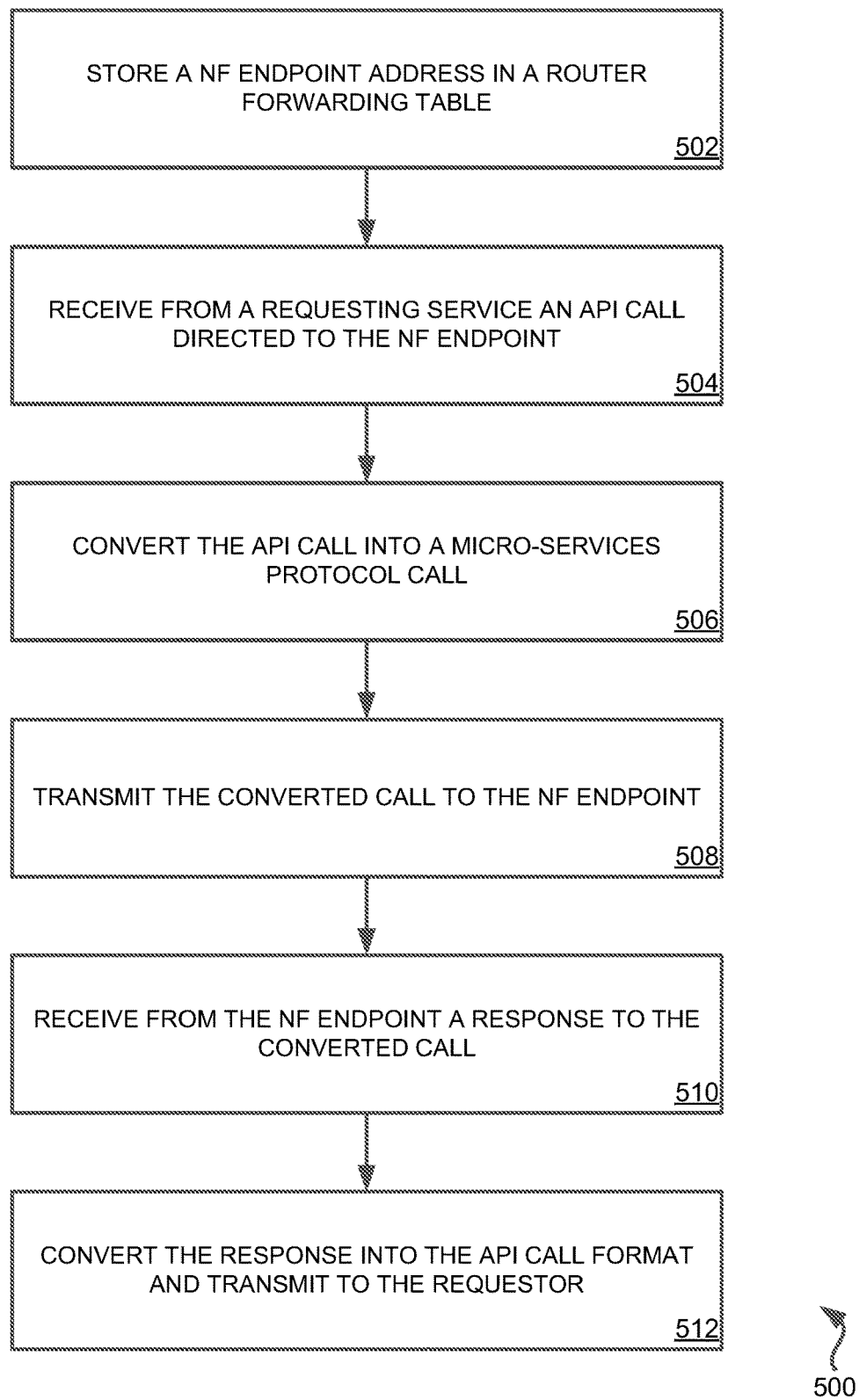
FIG. 5 illustrates an example method for routing signals.

FIG. 5 depicts a method 500 by which, for example, signal routing engine 302 and the like may perform, for example, call sequence 400. While method 500 is depicted as ordered blocks, it is understood that said blocks may be ordered differently than depicted and some blocks may not be performed while additional blocks not depicted may be additionally performed without straying from the disclosed invention.

A network function (NF) endpoint address may be stored in a router forwarding table (operation 502). In one embodiment, the forwarding table may be forwarding table 324 within signal routing engine 320. Further, NRF 318 may provide the NF endpoint address through an update procedure or the like.

Signal routing engine 320, for example, may then receive from a requesting service an API call directed to the NF endpoint stored in the table (operation 504).

The received API call may be converted into a micro-services protocol call (operation 506). In one embodiment, network function and service management service 322 may perform the conversion. In some examples, multiple micro-services protocols may be used and network function and service management service 322 may convert the API call to an appropriate micro-services protocol call based on which NF endpoint the call is directed to and the like.

Signal routing engine 320 can then transmit the converted call to the NF endpoint (operation 508). In one embodiment, network function and service management service 322 can transmit the converted call over service bus interface 316, which may be a hardware bus, virtual bus, or otherwise as will be apparent to a person having ordinary skill in the art.

In response, signal routing engine 320 may receive a response to the transmitted call from the NF endpoint (operation 510). The received response may then be converted into the same format as the received API call and transmitted to the requesting service (operation 512). In one embodiment, signal routing engine 320 may convert the response back into the original API call format by, for example, applying an inverted conversion process via network function and service management service 322. For example, network function and service management service 322 may include logic to convert to various formats based on transmission direction. In other examples, processes may be flagged and associated with a stack or the like which may be associated with conversion processes in order to maintain fluid and responsive signal routing between external processes and back end service micro-services. By decoupling complex parsing and routing from micro-services, each micro-service is thus able to more efficiently process procedure calls and so reduce latency, responsiveness, and the like.

Figure 6:
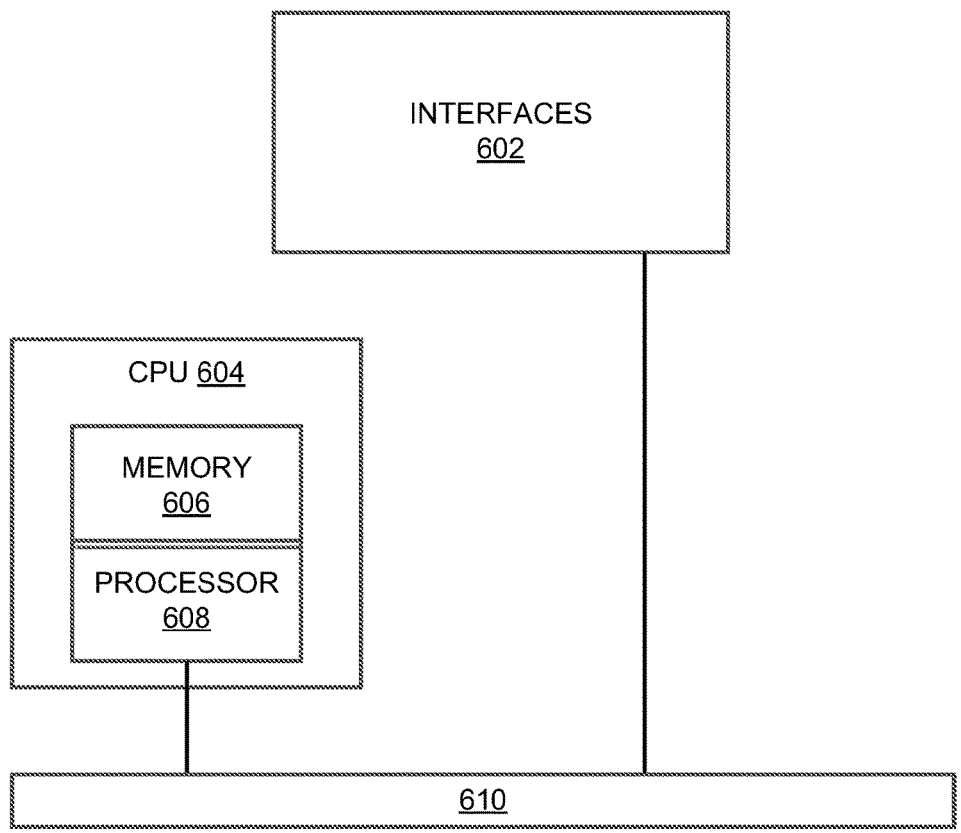
FIG. 6 illustrates an example network device.

The disclosure now turns to FIGS. 6 and 7, which illustrate example network and computing devices, such as switches, routers, load balancers, client computers, and so forth.

FIG. 6 illustrates an example network device 600 suitable for performing switching, routing, and other networking operations. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, TCAM, and the like) also forms part of CPU 604. However, there are many different ways in which memory could be coupled to the system. In some cases, the network device 600 can include a memory and/or storage hardware, such as TCAM, separate from CPU 604. Such memory and/or storage hardware can be coupled with the network device 600 and its components via, for example, connection 610.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, encryption processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

FIG. 7 illustrates a computing system architecture 700 including components in electrical communication with each other using a connection 705, such as a bus. System 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, and the like. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method for managing service calls across a network, the method comprising:
   retrieving, by a global source routing engine (SRE) and from a network repository function (NRF), a list comprising network functions (NFs) and endpoint addresses associated with respective NFs, the global SRE comprising a forwarding table;
   storing, in the forwarding table, the retrieved list;
   transmitting, by the global SRE and to a target SRE, a portion of the list, a portion of the list related to a network slice for which the target SRE is responsible;
   receiving, by the target SRE and from an access function (AMF), a request for slice information, the request for slice information including a user equipment (UE) identifier; and
   providing, by the target SRE and to the AMF, a response including the slice information for attaching the UE to a network slice identified by the slice information.

2. The method of claim 1, further comprising retrieving, by the target SRE and from a network slice selection function (NSSF), slice information in response to the request for slice information.

3. The method of claim 1, further comprising:
   transmitting, by the AMF and to a session management function (SMF), a command for creating a protocol data unit (PDU) context; and
   receiving, by the AMF and from the SMF, a PDU context for attaching the UE to the network slice identified by the slice information.

4. The method of claim 3, further comprising:
   receiving, by a second target SRE and from the SMF, a request for quality of service (QOS) information;
   retrieving, by the second target SRE, QOS information from a policy control function (PCF) based on the received request for QOS information; and transmitting, to the SMF, the retrieved QOS information for creating the PDU context.

5. The method of claim 1, further comprising:
receiving, by the target SRE, an application programming interface (API) call directed to a NF of the list comprising NFs and endpoint addresses, the API call formatted in a web protocol;
converting, by the target SRE, the API call from the web protocol format to a micro-services protocol format; and
transmitting, by the target SRE and to the NF, the converted API call based on an endpoint address associated with the NF, the endpoint address from the list comprising NFs and endpoint addresses.

6. The method of claim 5, further comprising:
receiving, by the target SRE and from the NF, a response to the transmitted converted API call, the response in a micro-services protocol format;
converting, by the target SRE, the received response to the transmitted API call into web protocol format; and
transmitting, by the target SRE and to a destination service, the web protocol formatted response to the transmitted API call.

7. The method of claim 5, wherein the micro-services protocol format is gRPC and the web protocol format is HTTP/2.

8. A system for managing service calls across a network, the system comprising:
a global source routing engine (SRE) comprising a forwarding table;
a network repository function (NRF) in communication with the global SRE, the global SRE retrieving from the NRF a list comprising network functions (NFs) and endpoint addresses associated with respective NFs;
a target SRE in communication with the global SRE, the global SRE transmitting to the target SRE a portion of the list related to a network slice for which the target SRE is responsible; and
an access function (AMF) in communication with the target SRE, the target SRE receiving from the AMF a request for slice information, the request for slice information including a user equipment (UE) identifier;
wherein the target SRE provides to the AMF a response including the slice information for attaching the UE to a network slice identified by the slice information.

9. The system of claim 8, further comprising a network slice selection function (NSSF), wherein the target SRE retrieves from the NSSF slice information in response to the request for slice information.

10. The system of claim 8, further comprising a session management function (SMF) in communication with the AMF, the AMF transmitting to the SMF a command for creating a protocol data unit (PDU) context, wherein the AMF receives from the SMF a PDU context for attaching the UE to the network slice identified by the slice information.

11. The system of claim 10, further comprising:
a second target SRE in communication with the SMF, the second target SRE receiving from the SMF a request for a quality of service (QOS) information; and
a policy control function (PCF) in communication with the second target SRE, the second target SRE retrieving from the PCF QOS information based on the received request for QOS information, and the SMF receives the retrieved QOS information for creating the PDU context.

12. The system of claim 8, wherein:
the target SRE receives an application programming interface (API) call directed to a NF of the list comprising NFs and endpoint addresses, the API call formatted in a web protocol; and
the target SRE converts the API call from the web protocol format to a micro-services protocol format and transmits to the NF the converted API call based on an endpoint address associated with the NF, the endpoint address from the list comprising NFs and endpoint addresses.

13. The system of claim 12, further comprising a destination service and wherein:
the target SRE receives from the NF a response to the transmitted converted API call, the response in a micro-services protocol format; and
the target SRE converts the received response to the transmitted API call into web protocol format and transmits to the destination service the web protocol formatted response to the transmitted API call.

14. The system of claim 12, wherein the micro-services protocol is gRPC and the web protocol is HTTP/2.

15. A non-transitory computer readable medium comprising instructions that, when executed by one or more processors configured for network management, cause the one or more processors to:
retrieve, by a global source routing engine (SRE) and from a network repository function (NRF), a list comprising network functions (NFs) and endpoint addresses associated with respective NFs, the global SRE comprising a forwarding table;
store, in the forwarding table, the retrieved list;
transmit, by the global SRE and to a target SRE, a portion of the list, a portion of the list related to a network slice for which the target SRE is responsible;
receive, by the target SRE and from an access function (AMF), a request for slice information, the request for slice information including a user equipment (UE) identifier; and
provide, by the target SRE and to the AMF, a response including the slice information for attaching the UE to a network slice identified by the slice information.

16. The non-transitory computer readable medium of claim 15, further comprising instructions that, when executed by one or more processors configured for network management, cause the one or more processors to retrieve, by the target SRE and from a network slice selection function (NSSF), slice information in response to the request for slice information.

17. The non-transitory computer readable medium of claim 15, further comprising instructions that, when executed by one or more processors configured for network management, cause the one or more processors to:
transmit, by the AMF and to a session management function (SMF), a command for creating a protocol data unit (PDU) context; and
receive, by the AMF and from the SMF, a PDU context for attaching the UE to the network slice identified by the slice information.

18. The non-transitory computer readable medium of claim 17, further comprising instructions that, when executed by one or more processors configured for network management, cause the one or more processors to:
receive, by a second target SRE and from the SMF, a request for quality of service (QOS) information;
retrieve, by the second target SRE, QOS information from a policy control function (PCF) based on the received request for QOS information; and transmit, to the SMF, the retrieved QOS information for creating the PDU context.

19. The non-transitory computer readable medium of claim 15, further comprising instructions that, when executed by one or more processors configured for network management, cause the one or more processors to:
- receive, by the target SRE, an application programming interface (API) call directed to a NF of the list comprising NFs and endpoint addresses, the API call formatted in a web protocol;
- convert, by the target SRE, the API call from the web protocol format to a micro-services protocol format; and
- transmit, by the target SRE and to the NF, the converted API call based on an endpoint address associated with the NF, the endpoint address from the list comprising NFs and endpoint addresses.

20. The non-transitory computer readable medium of claim 19, further comprising instructions that, when executed by one or more processors configured for network management, cause the one or more processors to:
- receive, by the target SRE and from the NF, a response to the transmitted converted API call, the response in a micro-services protocol format;
- convert, by the target SRE, the received response to the transmitted API call into web protocol format; and
- transmit, by the target SRE and to a destination service, the web protocol formatted response to the transmitted API call.

* * * * *